R. FARREN & C. T. CLARK.
ELECTRIC HEATER.
APPLICATION FILED DEC. 3, 1908.
942,894.
Patented Dec. 14, 1909.
2 SHEETS—SHEET 1.
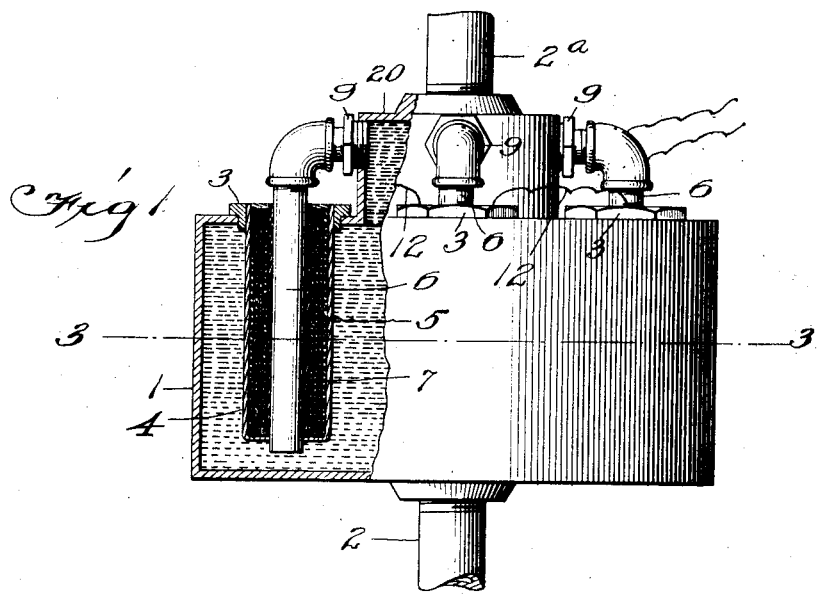
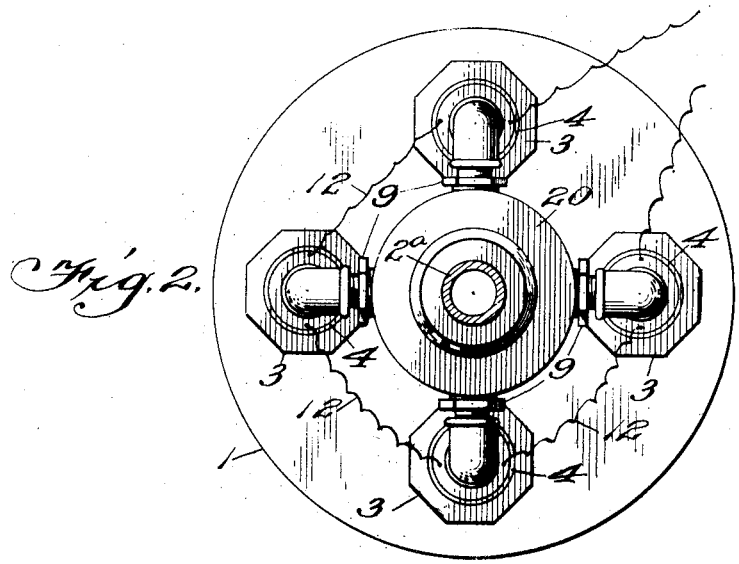
Inventors
Robert Farren
Chas. T. Clark.

R. FARREN & C. T. CLARK.
ELECTRIC HEATER.
APPLICATION FILED DEC. 3, 1908.
942,894.
Patented Dec. 14, 1909.
2 SHEETS—SHEET 2.
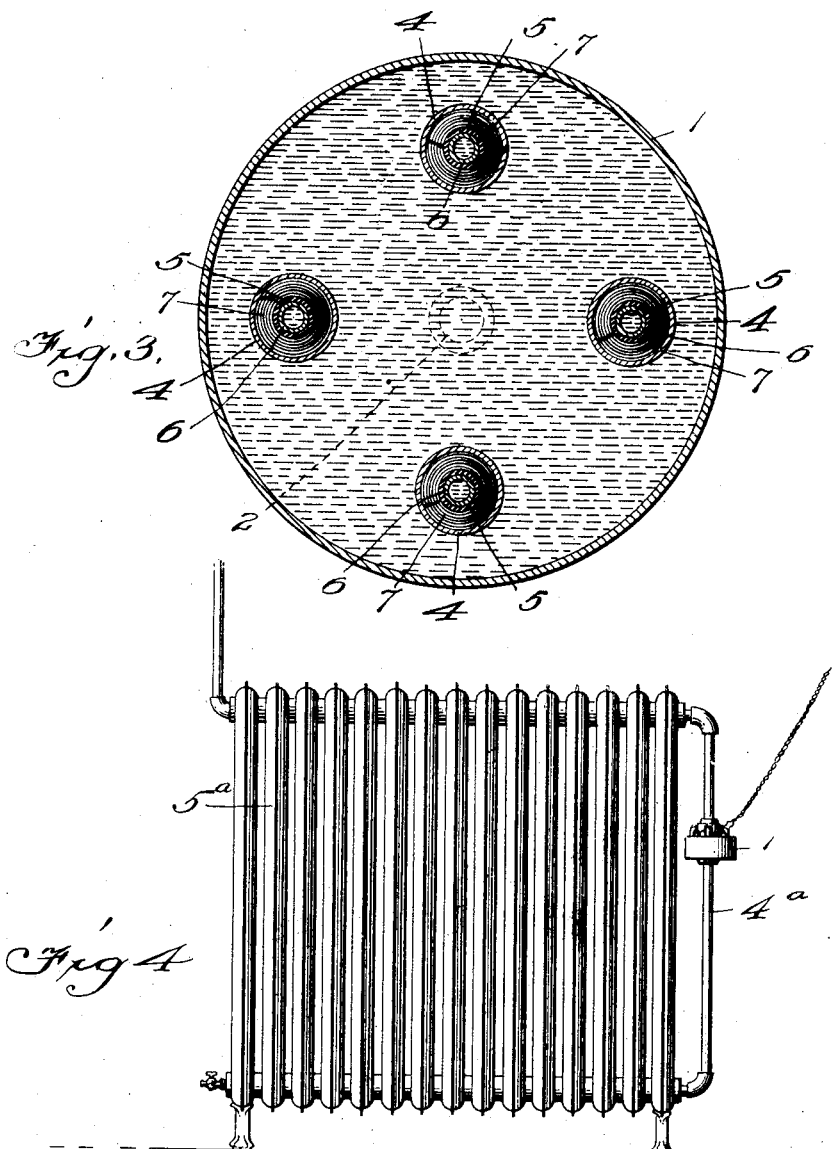
Witnesses
Inventors
Robert Farren.
Chas. T. Clark.
By Geo. E. Tew
Attorney

UNITED STATES PATENT OFFICE.

ROBERT FARREN AND CHARLES T. CLARK, OF CLEVELAND, OHIO.

ELECTRIC HEATER.

942,894.   Specification of Letters Patent.   Patented Dec. 14, 1909.

Application filed December 3, 1908. Serial No. 465,809.

*To all whom it may concern:*

Be it known that we, ROBERT FARREN and CHARLES T. CLARK, citizens of the United States, residing at Cleveland, in the county of Cuyahoga and State of Ohio, have invented certain new and useful Improvements in Electric Heaters, of which the following is a specification.

This invention is an electric heater particularly adapted for heating water and other liquids, and useful as a water heater in any form of water heating system, such as those used in residences, cars, green houses and the like; also capable of use for domestic purposes.

The object of the invention is to form a device improved with respect to the construction of the heater, with advantages as to the mode of circulating the fluid around the heating coils, whereby the fluid is exposed to the influence thereof at both the inside and the outside of said coils.

An embodiment of the invention is illustrated in the accompanying drawings in which—

Figure 1 is a side elevation, partly in section, of the heater. Fig. 2 is a top plan view. Fig. 3 is a section on the line 3—3 of Fig. 1. Fig. 4 is a side elevation showing the electric heater applied to a house radiator.

Referring specifically to the drawings, 1 indicates a cylindrical outer casing forming a water chamber and having inlet and outlet pipes 2 and 2ª. The electric heating devices are located or mounted within said chamber. The inlet pipe 2 is tapped into the bottom of the casing. At the top the casing has a central enlargement or upwardly projecting portion into which the outlet pipe 2ª is tapped.

Each of the heaters consists of an outer metallic casing 4 supported by a threaded bushing 3 in which the upper end of the casing is securely fastened. This bushing screws into a tapped hole formed to receive the same in the top of the casing. A circulating pipe 6 extends through the casing and opens at its lower end into the bottom part of the water chamber, and at its upper end is connected by an elbow and suitable coupling 9 to the upper part or dome 20 of the chamber. The heating coil 7 is located in the space between the cylinder 4 and the pipe 6, a non-electric conducting sleeve 5 being placed over or around the pipe 6, the coils being embedded in insulating material between the sleeve 5 and the outer tube 4. The coils are connected in series by suitable wires 12, having leads to the source of current.

Water contained in the chamber will circulate around the tubes 4 which will be heated by the coils therein, and the heat communicated to the water. Some of the water will also be heated in the tubes 6 and flow up through the same and into the top of the casing and thence to the outlet. The material 5 will insulate the tubes 6 from the coils, but will allow the heat to pass through the same to the water in said pipes. Part of the water will pass direct through the chamber 1 from the inlet pipe 2 to the outlet pipe 2ª, receiving its heat from the outside of the heating device, and the remainder will flow up through the tube 6 and be heated within the coils. This provides an advantageous circulation of the water for the communication of heat thereto without interfering with the further circulation of the water.

In Fig. 4 the device is shown applied to a house radiator 5, the heater being inserted in the lower opening of the radiator and having a circulating pipe 4 with suitable connections.

The number of coils in the chamber may be varied as desired, and any coil can be removed by unscrewing the coupling 9 and the bushing 3, allowing the coil and connecting pipe to be lifted out.

We claim:

1. An electric heater comprising a chamber, a bushing tapped into a wall thereof, a tubular casing fastened to the bushing and projecting into the chamber, a pipe extending lengthwise through the bushing from the exterior of the chamber and opening into the same at both ends and having an exterior detachable coupling, and a resistance coil between the pipe and the casing.

2. An electric heater comprising a chamber having a central raised part or dome, and a plurality of heating devices projecting into the body of the chamber and including circulation pipes leading from the lower part of the chamber with exterior detachable couplings to the dome.

3. An electric heater comprising a chamber having at its top a central raised part or dome, and provided with inlet and outlet pipes leading into its said dome, and into its base, respectively, bushings tapped into the top of said chamber around said dome tubular casings fastened to, and having their upper ends closed by, said bushings, and projecting downwardly into the chamber, pipes extending outwardly from said dome and downwardly through said bushings and casings, and provided with exterior couplings located between said dome and said bushings, and resistance coils between said pipes and their casings, said coils being connected in series.

In testimony whereof, we affix our signatures in presence of two witnesses.

ROBERT FARREN.
CHARLES T. CLARK.

Witnesses:
 LOUIS PRESSLER,
 JOHN A. BOMMHARDT.